(12) United States Patent  
Groe

(10) Patent No.: US 7,894,545 B1  
(45) Date of Patent: Feb. 22, 2011

(54) TIME ALIGNMENT OF POLAR TRANSMITTER

(75) Inventor: John B. Groe, Poway, CA (US)

(73) Assignee: Quintic Holdings, Santa Clara, CA (US)

(*) Notice: Subject to any disclaimer, the term of this patent is extended or adjusted under 35 U.S.C. 154(b) by 671 days.

(21) Appl. No.: 11/837,983

(22) Filed: Aug. 13, 2007

Related U.S. Application Data

(60) Provisional application No. 60/822,357, filed on Aug. 14, 2006.

(51) Int. Cl.  
*H04L 27/04* (2006.01)

(52) U.S. Cl. ..................................... 375/295

(58) Field of Classification Search .............. 375/295, 375/296, 300, 302; 455/73, 91, 108  
See application file for complete search history.

(56) References Cited

U.S. PATENT DOCUMENTS

| | | |
|---|---|---|
| 4,263,560 A | 4/1981 | Ricker |
| 4,430,627 A | 2/1984 | Machida |
| 4,769,588 A | 9/1988 | Panther |
| 4,816,772 A | 3/1989 | Klotz |
| 4,926,135 A | 5/1990 | Voorman |
| 4,965,531 A | 10/1990 | Riley |
| 5,006,818 A | 4/1991 | Koyama et al. |
| 5,015,968 A | 5/1991 | Podell et al. |
| 5,030,923 A | 7/1991 | Arai |
| 5,289,136 A | 2/1994 | DeVeirman et al. |
| 5,331,292 A | 7/1994 | Worden et al. |
| 5,399,990 A | 3/1995 | Miyake |
| 5,491,450 A | 2/1996 | Helms et al. |
| 5,508,660 A | 4/1996 | Gersbach et al. |
| 5,548,594 A | 8/1996 | Nakamura |
| 5,561,385 A | 10/1996 | Choi |
| 5,581,216 A | 12/1996 | Ruetz |
| 5,625,325 A | 4/1997 | Rotzoll et al. |
| 5,631,587 A | 5/1997 | Co et al. |
| 5,648,744 A | 7/1997 | Prakash et al. |
| 5,677,646 A | 10/1997 | Entrikin |
| 5,739,730 A | 4/1998 | Rotzoll |
| 5,767,748 A | 6/1998 | Nakao |
| 5,818,303 A | 10/1998 | Oishi et al. |
| 5,834,987 A | 11/1998 | Dent |
| 5,862,465 A | 1/1999 | Ou |
| 5,878,101 A | 3/1999 | Aisaka |
| 5,880,631 A | 3/1999 | Sahota |
| 5,939,922 A | 8/1999 | Umeda |
| 5,945,855 A | 8/1999 | Momtaz |
| 5,949,286 A | 9/1999 | Jones |
| 5,990,740 A | 11/1999 | Groe |
| 5,994,959 A | 11/1999 | Ainsworth |
| 5,999,056 A | 12/1999 | Fong |
| 6,011,437 A | 1/2000 | Sutardja et al. |
| 6,018,651 A | 1/2000 | Bruckert et al. |

(Continued)

*Primary Examiner*—Kevin Y Kim  
(74) *Attorney, Agent, or Firm*—Blairtech Solutions LLC

(57) ABSTRACT

An alignment apparatus for use with a polar transmitter system is disclosed herein. The alignment apparatus includes a signal alignment module configured to apply an amplitude modulation control signal and a frequency modulation control signal to the polar transmitter in accordance with a defined timing relationship. A time alignment network, operatively coupled between an output of the polar transmitter system and the signal alignment module, sets the defined timing relationship.

22 Claims, 18 Drawing Sheets

Time-Aligned Polar Transmitter using a DLL

U.S. PATENT DOCUMENTS

| | | | |
|---|---|---|---|
| 6,031,425 A | 2/2000 | Hasegawa |
| 6,044,124 A | 3/2000 | Monahan et al. |
| 6,052,035 A | 4/2000 | Nolan et al. |
| 6,057,739 A | 5/2000 | Crowley et al. |
| 6,060,935 A | 5/2000 | Shulman |
| 6,091,307 A | 7/2000 | Nelson |
| 6,100,767 A | 8/2000 | Sumi |
| 6,114,920 A | 9/2000 | Moon et al. |
| 6,163,207 A | 12/2000 | Kattner et al. |
| 6,173,011 B1 | 1/2001 | Rey et al. |
| 6,191,956 B1 | 2/2001 | Foreman |
| 6,204,728 B1 | 3/2001 | Hageraats |
| 6,211,737 B1 | 4/2001 | Fong |
| 6,229,374 B1 | 5/2001 | Tammone, Jr. |
| 6,246,289 B1 | 6/2001 | Pisati et al. |
| 6,255,889 B1 | 7/2001 | Branson |
| 6,259,321 B1 | 7/2001 | Song et al. |
| 6,288,609 B1 | 9/2001 | Brueske et al. |
| 6,298,093 B1 | 10/2001 | Genrich |
| 6,333,675 B1 | 12/2001 | Saito |
| 6,370,372 B1 | 4/2002 | Molnar et al. |
| 6,392,487 B1 | 5/2002 | Alexanian |
| 6,404,252 B1 | 6/2002 | Wilsch |
| 6,476,660 B1 | 11/2002 | Visocchi et al. |
| 6,515,553 B1 | 2/2003 | Filiol et al. |
| 6,559,717 B1 | 5/2003 | Lynn et al. |
| 6,560,448 B1 | 5/2003 | Baldwin et al. |
| 6,571,083 B1 | 5/2003 | Powell, II et al. |
| 6,577,190 B2 | 6/2003 | Kim |
| 6,583,671 B2 | 6/2003 | Chatwin |
| 6,583,675 B2 | 6/2003 | Gomez |
| 6,639,474 B2 | 10/2003 | Asikainen et al. |
| 6,664,865 B2 | 12/2003 | Groe et al. |
| 6,683,509 B2 | 1/2004 | Albon et al. |
| 6,693,977 B2 | 2/2004 | Katayama et al. |
| 6,703,887 B2 | 3/2004 | Groe |
| 6,711,391 B1 | 3/2004 | Walker et al. |
| 6,724,235 B2 | 4/2004 | Costa et al. |
| 6,734,736 B2 | 5/2004 | Gharpurey |
| 6,744,319 B2 | 6/2004 | Kim |
| 6,751,272 B1 | 6/2004 | Burns et al. |
| 6,753,738 B1 | 6/2004 | Baird |
| 6,763,228 B2 | 7/2004 | Prentice et al. |
| 6,774,740 B1 | 8/2004 | Groe |
| 6,777,999 B2 | 8/2004 | Kanou et al. |
| 6,781,425 B2 | 8/2004 | Si |
| 6,795,843 B1 | 9/2004 | Groe |
| 6,798,290 B2 | 9/2004 | Groe et al. |
| 6,801,089 B2 | 10/2004 | Costa et al. |
| 6,845,139 B2 | 1/2005 | Gibbons |
| 6,856,205 B1 | 2/2005 | Groe |
| 6,870,411 B2 | 3/2005 | Shibahara et al. |
| 6,917,719 B2 | 7/2005 | Chadwick |
| 6,940,356 B2 | 9/2005 | McDonald, II et al. |
| 6,943,600 B2 | 9/2005 | Craninckx |
| 6,975,687 B2 | 12/2005 | Jackson et al. |
| 6,985,703 B2 | 1/2006 | Groe et al. |
| 6,990,327 B2 | 1/2006 | Zheng et al. |
| 7,062,248 B2 | 6/2006 | Kuiri |
| 7,065,334 B1 | 6/2006 | Otaka et al. |
| 7,088,979 B1 | 8/2006 | Shenoy et al. |
| 7,123,102 B2 | 10/2006 | Uozumi et al. |
| 7,142,062 B2 | 11/2006 | Vaananen et al. |
| 7,148,764 B2 | 12/2006 | Kasahara et al. |
| 7,171,170 B2 | 1/2007 | Groe et al. |
| 7,215,215 B2 | 5/2007 | Hirano et al. |
| 2002/0071497 A1 | 6/2002 | Bengtsson et al. |
| 2002/0135428 A1 | 9/2002 | Gomez |
| 2002/0193009 A1 | 12/2002 | Reed |
| 2003/0078016 A1 | 4/2003 | Groe et al. |
| 2003/0092405 A1 | 5/2003 | Groe et al. |
| 2003/0118143 A1 | 6/2003 | Bellaouar et al. |
| 2003/0197564 A1 | 10/2003 | Humphreys et al. |
| 2004/0017852 A1 | 1/2004 | Redman-White |
| 2004/0051590 A1 | 3/2004 | Perrott et al. |
| 2005/0093631 A1 | 5/2005 | Groe |
| 2005/0099232 A1 | 5/2005 | Groe et al. |
| 2006/0003720 A1 | 1/2006 | Lee et al. |
| 2007/0275676 A1* | 11/2007 | Rofougaran et al. ...... 455/127.1 |

* cited by examiner

QPSK Modulation: Ideal Symbols

QPSK Modulation: Trajectory of Complex Signal

Typical I/Q modulator

Polar Transmitter Architecture

Conventional PLL

Mathematical Model of the PLL

Integration Filter

Fractional-N PLL using a ΔΣ modulator: Block Diagram

Fractional-N PLL using a ΔΣ modulator: Frequency Response

Direct Phase/Frequency Modulator: Block Diagram

Direct Phase/Frequency Modulator: Frequency Response

Envelope Variation

Variable Gain Amplifier,

DC regulator and Switched-Mode PA

Compressed PA with Feedback

Spectral Regrowth due to Timing Error

EDGE

WCDMA

EDGE

WCDMA

Time-Aligned Polar Transmitter using a DLL

Time-Aligned Polar Transmitter with Digital Delay

Figure 14. Time Alignment Network: a) Diagram, b) Complex Symbols, c) Complex Signal, Figure 14. Time Alignment Network: d) Source Network and e) Alternative Approach Frequency Spectrum of Polar Transmitter with Test Signal:
a) Perfect Timing Alignment and b) 2.5nSec Timing Error Alignment Network Convergence Examples of Other Test Signals

US 7,894,545 B1

TIME ALIGNMENT OF POLAR TRANSMITTER

CROSS REFERENCE TO RELATED APPLICATIONS

This application claims priority under 35 U.S.C. §119(e) to U.S. Provisional Application Ser. No. 60/822,357, entitled TIME ALIGNMENT OF A POLAR TRANSMITTER, filed on Aug. 14, 2006, which is incorporated by reference herein for all purposes. This application is related to U.S. patent application Ser. No. 10/265,215, entitled DIRECT SYNTHESIS TRANSMITTER, the disclosure of which is incorporated herein by reference for all purposes.

FIELD OF THE INVENTION

The present invention relates generally to radio transmitters using polar modulation.

BACKGROUND OF THE INVENTION

Phase modulation schemes are very effective and are therefore widely used in communication systems. A simple example of a phase modulation scheme is quaternary phase shift keying (QPSK). This modulation scheme maps two-bit digital data to one of four phase offsets as shown in FIG. 1a. Ideally, the trajectory of the complex signal intersects these symbols at periodic points in time. In practice, pulse-shaping filters—needed to constrain the frequency spectrum of the signal—introduce some variations as illustrated by FIG. 1b.

FIG. 2 shows a typical QPSK (or I/Q) modulator used to generate the complex phase-modulated signal. This technique relies on orthogonal signal vectors to realize the phase offsets—an inherently linear technique, since it depends solely on the matching of these orthogonal signals.

The I/Q modulator provides a straightforward approach to generating phase-modulated signals. But, it's also possible to generate the phase-modulated signals using a polar transmitter such as the one shown in FIG. 3. This approach reduces circuitry, lowers power consumption, and potentially supports multiple modulation formats. It separately applies the phase and amplitude signals with precise alignment to realize the complex QPSK modulation. Unfortunately, several factors make this alignment very difficult. It would therefore be advantageous to be able to precisely align the phase and amplitude modulation signals.

SUMMARY OF THE INVENTION

In summary, the invention relates to a system and method for effecting precise time alignment of modulation signals applied within a polar transmitter.

A particular aspect of the invention is directed to a polar transmitter system including a direct synthesis modulator and a signal alignment module. The direct synthesis modulator is operative to generate an output signal based upon a reference signal. During this generation process the direct synthesis modulator is responsive to an amplitude modulation control signal and a frequency modulation control signal. A signal alignment module is configured to apply the amplitude modulation control signal and the frequency modulation control signal to the direct synthesis modulator in accordance with a defined timing relationship. The amplitude modulation control signal and the frequency modulation control signal are based upon an input amplitude modulation signal and an input phase or frequency modulation signal, respectively.

In another aspect the invention pertains to a signal alignment module for use with a polar transmitter. The alignment module includes a first latch arrangement which latches an input amplitude modulation signal and a second latch arrangement which latches an input phase or frequency modulation signal. A triggering network provides a first timing signal to the first latch arrangement and a second timing signal to the second latch arrangement. The triggering network also establishes a defined time offset between the first timing signal and the second timing signal.

A further aspect of the invention may be embodied in an alignment apparatus for use with a polar transmitter system. The alignment apparatus includes a signal alignment module configured to apply an amplitude modulation control signal and a frequency modulation control signal to the polar transmitter in accordance with a defined timing relationship. A time alignment network, operatively coupled between an output of the polar transmitter system and the signal alignment module, sets the defined timing relationship.

The present invention is also directed to an apparatus for adjusting signal time alignment within a polar transmitter system. The apparatus includes a signal alignment module operative to apply control signals to the polar transmitter system. The apparatus further includes a time alignment network for setting a timing relationship imposed upon the control signals by the signal alignment module. The time alignment network includes: a signal source unit coupled to the signal alignment module, a receiver coupled to an output of the polar transmitter system, and a control network coupled between an output of the receiver and the signal alignment module.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein:

FIG. 7b illustrates the frequency response of the fractional-N PLL shown in FIG. 7a;

FIG. 8b illustrates the frequency response of the direct phase/frequency modulator shown in FIG. 7a;

FIG. 16 illustrates the convergence of the alignment adjustment system of FIG. 14a.

DETAILED DESCRIPTION

Figure 1A:
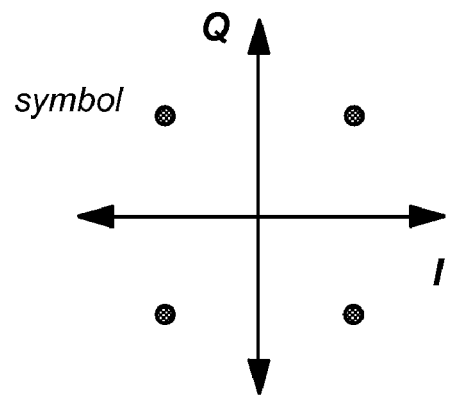
FIG. 1a shows a constellation diagram that illustrates how QPSK maps two-bit digital data to one of four offsets.
Figure 1B:
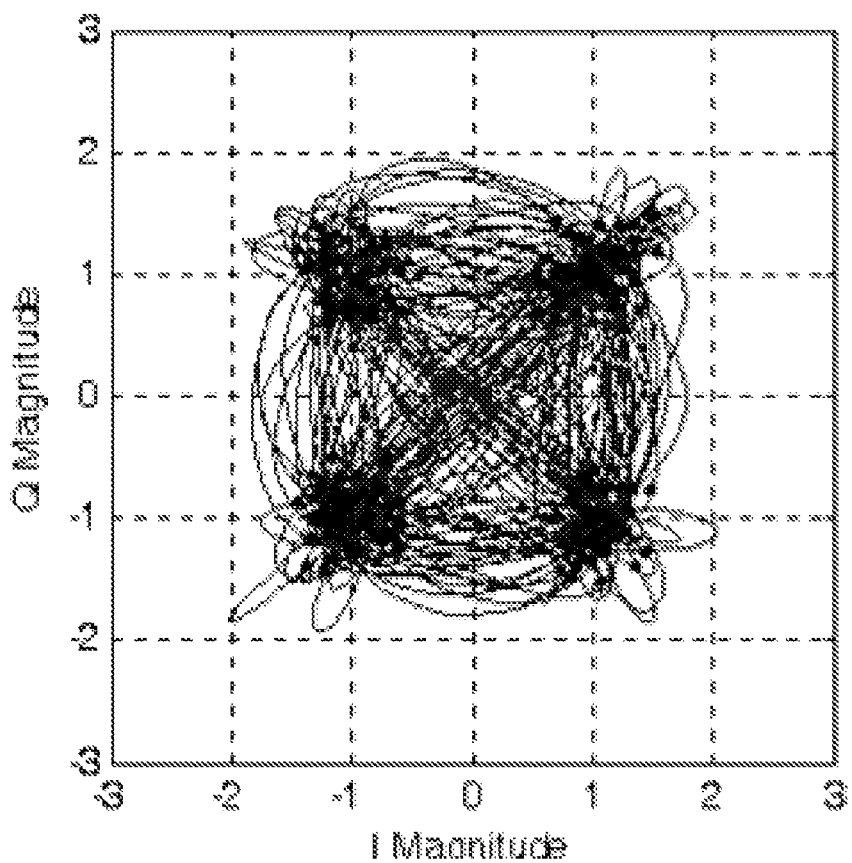
FIG. 1b illustrates the trajectory of the complex signal for QPSK modulation.
Figure 2:
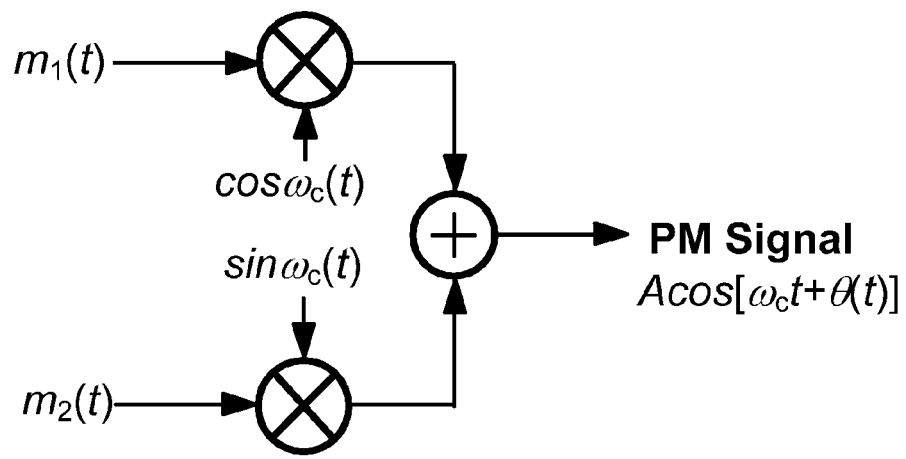
FIG. 2 shows a diagram of a typical I/Q modulator.
Figure 3:
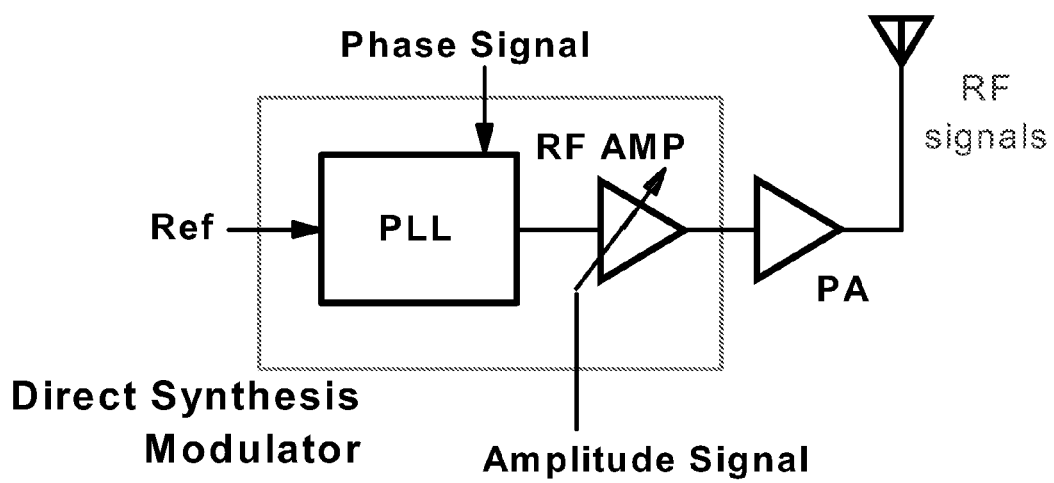
FIG. 3 shows a simplified diagram of a polar transmitter.

Referring again to the transmitter architecture of FIG. 3, a direct synthesis modulator or "polar transmitter" consists of a phase-locked loop (PLL) having a phase/frequency modulation capability followed by an amplitude modulation network.

Figure 4:
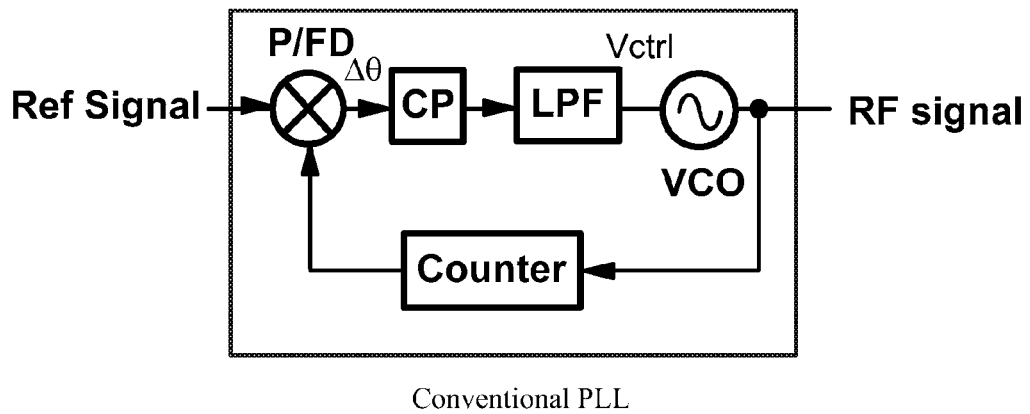
FIG. 4 shows a PLL that is used to synthesize a radio frequency carrier signal.
Figure 5:
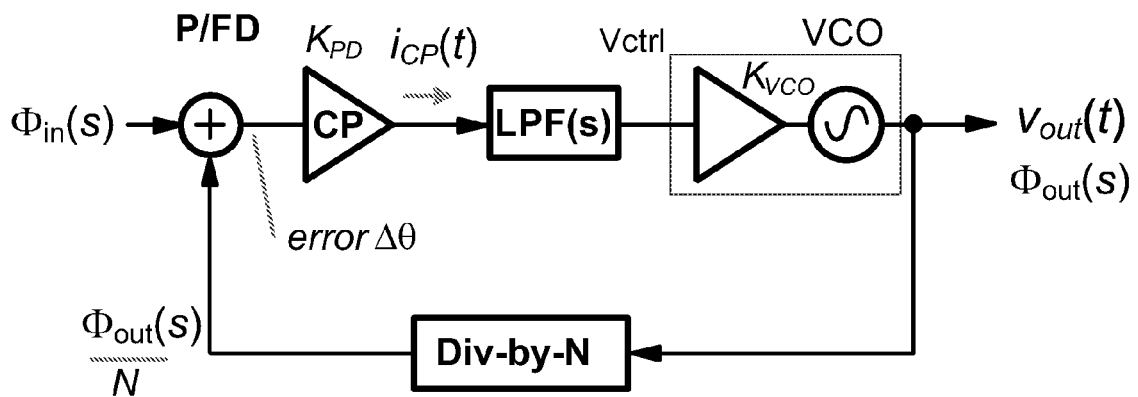
FIG. 5 shows a mathematical model of the PLL shown in FIG. 3.

FIG. 4 shows a block diagram of a phase-locked loop (PLL), which is used to synthesize a radio frequency carrier. It consists of a voltage-controlled oscillator (VCO), feedback counter (counter), phase/frequency detector (P/FD), charge pump (CP), and integration filter (LPF). This feedback system is further described by the mathematical model shown in FIG. 5.

The phase-locked loop uses feedback to minimize the phase difference between a very accurate reference signal and its output signal. As such, it produces an output signal at a frequency given by $$f_{VCO} = Nf_{REF}$$

where $f_{vco}$ is the frequency of the VCO output signal, N is the value of the feedback counter, and $f_{REF}$ is the frequency of the reference signal.

Figure 6:
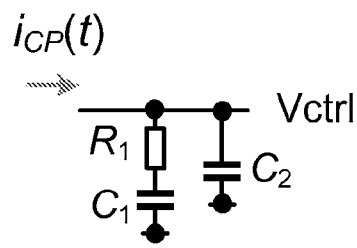
FIG. 6 shows an integration filter.

The voltage-controlled oscillator produces an output signal at a frequency set by the control voltage $v_{ctrl}$ according to $$v_{out}(t) = A\cos(\omega_o t + K_{vco}\int v_{ctrl}(t)dt)$$

where $\omega_o$ is the free-running frequency of the oscillator and $K_{vco}$ is its associated gain. The gain $K_{vco}$ describes the relationship between the excess phase of the carrier $\Phi_{out}$ and the control voltage $v_{ctrl}$ with $$\frac{\Phi_{out}(s)}{v_{ctrl}(s)} = \frac{K_{vco}}{s}$$

where $K_{vco}$ is in radians/V. The VCO drives the feedback counter, which simply divides the output phase $\Phi_{out}$ by N. When the phase-locked loop is stable, the phase detector and charge pump circuits generate an output signal $i_{CP}$ that is proportional to the phase difference $\Delta\theta$ between the two signals applied to the phase detector. The output signal $i_{CP}$ can therefore be expressed as $$i_{CP}(s) = K_{pd}\frac{\Delta\theta(s)}{2\pi}$$

where $K_{pd}$ is in A/radians and $\Delta\theta$ is in radians. A simple integration filter, comprising resistor $R_1$ and capacitors $C_1$-$C_2$ as shown in FIG. 6, transforms the output signal $i_{CP}$ to the control voltage $v_{ctrl}$ as follows $$v_{ctrl}(s) = i_{out}(s)Z(s) = i_{out}(s)\left(\frac{sR_1C_1 + 1}{s^2R_1C_1C_2 + s(C_1 + C_2)}\right)$$

where a zero (at $1/R_1C_1$) has been added to stabilize the second order system and the capacitor $C_2$ has been included to reduce any ripple on the control voltage. Combining the above relations yields the closed-loop response of the system to an input signal $$T_1(s) = \frac{NK_{PD}K_{VCO}Z(s)}{sN + K_{PD}K_{VCO}Z(s)}.$$

In a PLL, the feedback counter value N effectively sets the output frequency. In practice, its digital structure restricts N to integer numbers. As a result, the frequency resolution (or frequency step size) of an integer-N PLL is nominally set by $f_{REF}$. Fortunately, it's possible to dramatically decrease the effective frequency step by manipulating the value of N to yield a non-integer average value. This is the concept of the fractional-N PLL.

Figure 7A:
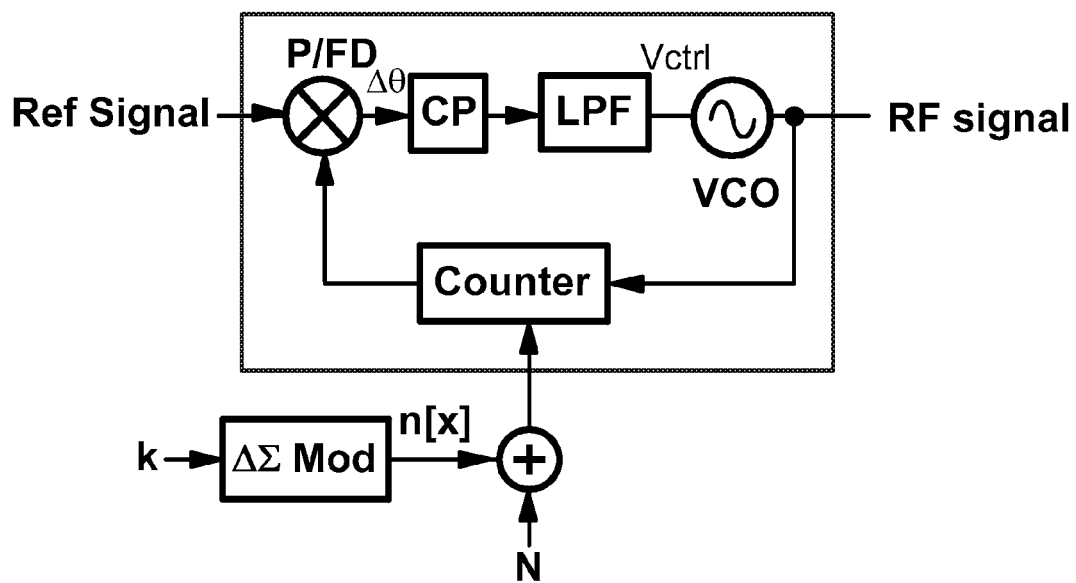
FIG. 7a shows one embodiment of a fractional-N PLL using a □□ modulator.

A fractional-N PLL that uses a $\Delta\Sigma$ modulator to develop non-integer values of N is shown in FIG. 7a. The $\Delta\Sigma$ modulator advantageously pushes spurious energy (created by the changing values of the feedback counter) to higher frequencies where it can be more effectively attenuated by the PLL's integration filter. It can be shown that the effective value of N is simply the average value described by $$N = \frac{\sum_{x=1}^{P} N[x]}{P}$$

where M[x] is the sequence of feedback counter values. This expands to $$N[x]=N_{int}+n[x]$$

where $N_{int}$ is the integer part and n[x] is the fractional part of N[x]. The ΔΣ modulator generates the sequence n[x] that satisfies $$\frac{\sum_{x=1}^{P} n[x]}{P} = \frac{k}{M}$$

where k is the input to the ΔΣ modulator with resolution M.

Figure 7B:
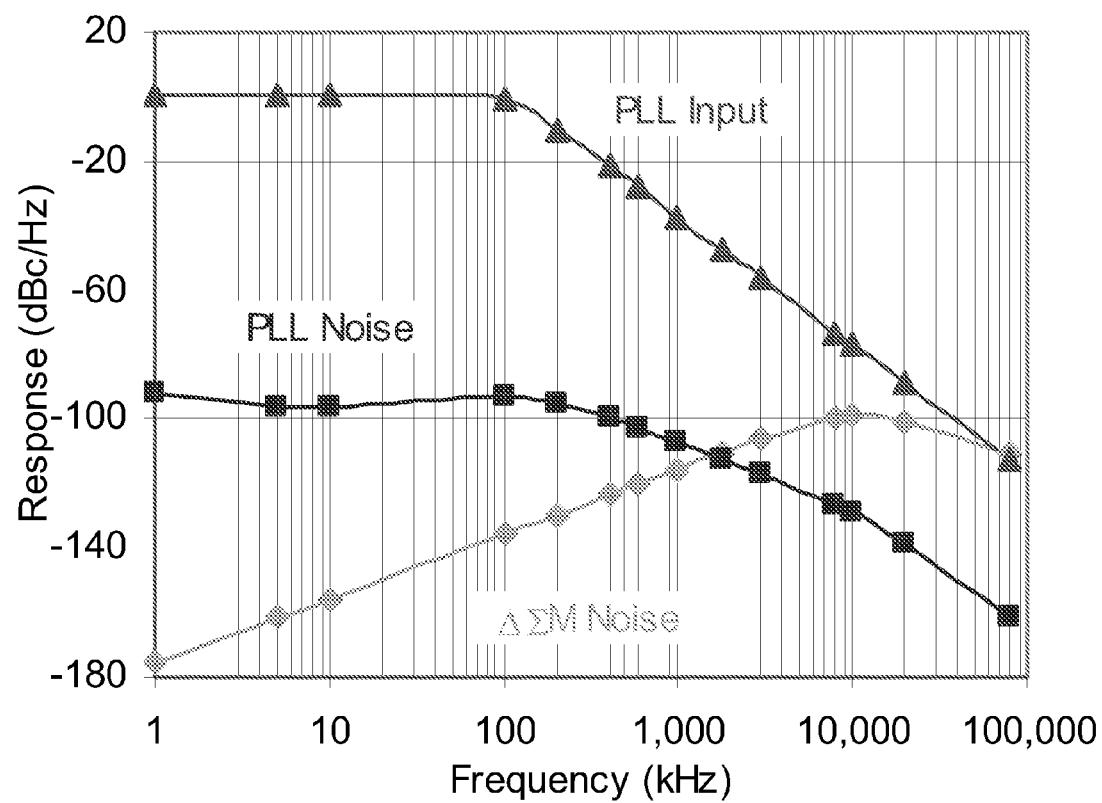

It's possible to use a fractional-N PLL as a very efficient phase/frequency modulator. That's because signals applied to the ΔΣ modulator's input control and actually modulate the frequency of the VCO according to $$f_{vco}=f_c+\Delta f(t)=(N_{int}+n[x])f_{REF}$$

where Δf(t) is the frequency modulation equal to $$\Delta f(t) = \left( n[x] - \frac{k}{M} \right) f_{REF} = \text{FM} f_{REF}$$

and FM is the applied modulation signal. In practice, the modulation is shaped by the PLL response described by transfer function $T_1(s)$. The PLL's response generally limits the bandwidth of the system so as to attenuate the ΔΣ modulator's quantization noise. This is illustrated in FIG. 7b.

Figure 8A:
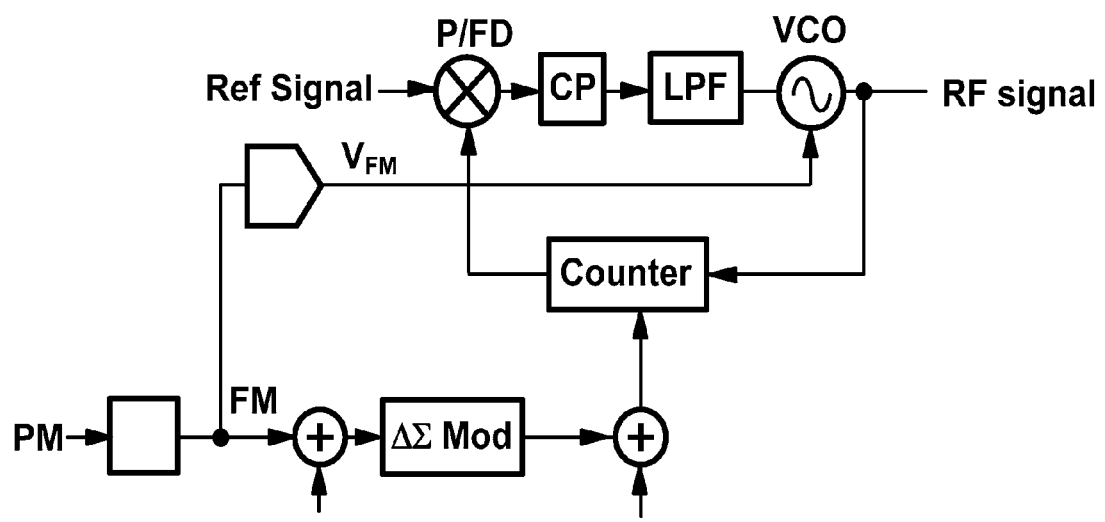
FIG. 8a illustrates one embodiment of a fractional-N PLL that supports direct frequency or phase modulation.
Figure 8B:
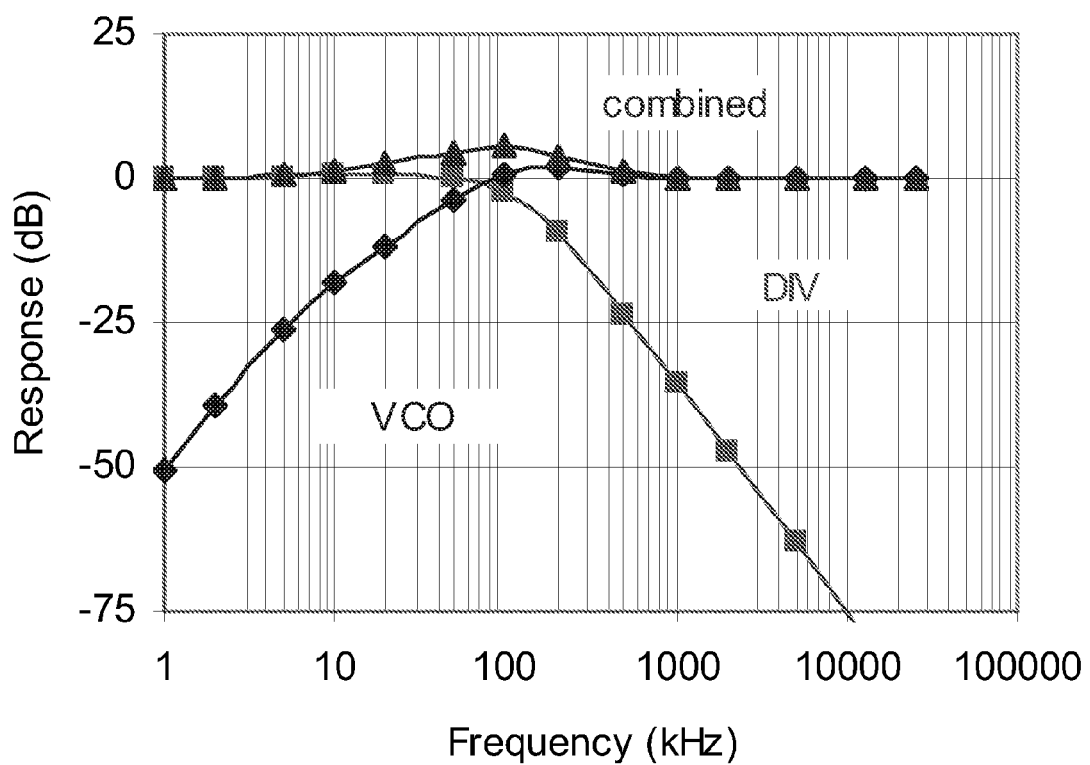

To overcome this bandwidth limitation, a second high-frequency modulation path is added to the phase-locked loop and VCO as shown in FIG. 8a. The resulting two-point frequency modulation system now displays a second and complimentary transfer function given by $$T_2(s) = \frac{sNK_{FM}}{sN + K_{PD}K_{VCO}Z(s)} v_{FM}$$

where $K_{FM}$ is the gain of the VCO port at which the $v_{FM}$ modulating signal is applied. Ideally, the two expressions combine to yield a flat and uniform response as illustrated in FIG. 8b. This occurs when $$\text{FM} f_{REF}=K_{FM}v_{FM}$$

The modulation applied to the fractional-N PLL and VCO adjusts the frequency of the output signal of the VCO, not its phase. To shift the phase of the output signal of the VCO, the phase modulation signal θ(t) must be differentiated with $$f(t) = \frac{d}{dt}[f_c t + \theta(t)] = f_c + \frac{d\theta(t)}{dt}$$

where $f_c$ is the carrier frequency. Since the phase signal is formed digitally and then converted to analog form, a simple difference circuit is used to compute the derivative of the discrete phase data θ(x)

$$d\theta(x+1)=\theta(x+1)-d\theta(x)$$

where x is the sample index and dθ(x) is the difference or derivative.

Figure 9:
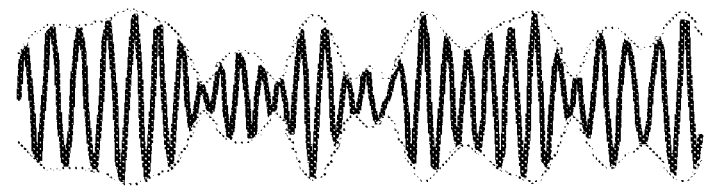
FIG. 9 illustrates the envelope variation for filtered QPSK modulation.

The fractional-N PLL and VCO generate a constant amplitude, phase/frequency-modulated signal centered at the carrier radio frequency. This allows the signal to be amplified using very efficient, compressed amplifiers. Unfortunately, the desired complex transmit signal typically shows envelop variations as illustrated by FIG. 9. As such, it becomes necessary to modulate the envelope of the phase/frequency-modulated signal to faithfully form the transmit signal.

Figure 10:
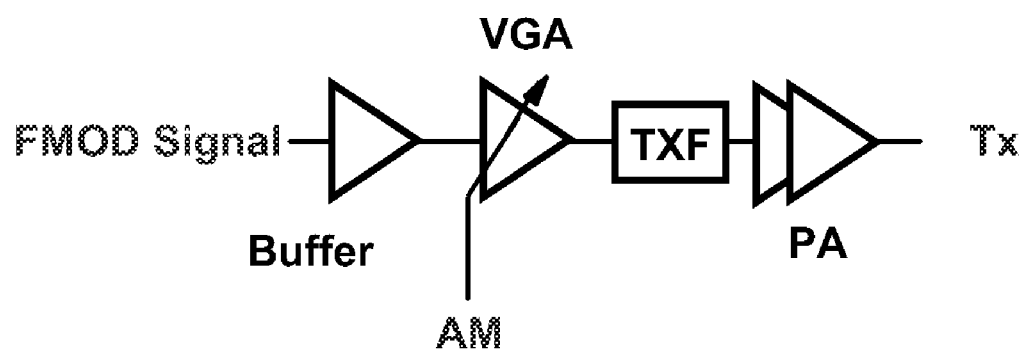
FIG. 10a shows a simplified diagram of an amplitude modulation system using a variable gain amplifier.
FIG. 10b shows a simplified diagram of an amplitude modulation system using a switched power amplifier, controlled by a dc-dc regulator.
FIG. 10c shows a simplified diagram of an amplitude modulation system using feedback to linearize its response.
Figure 10:
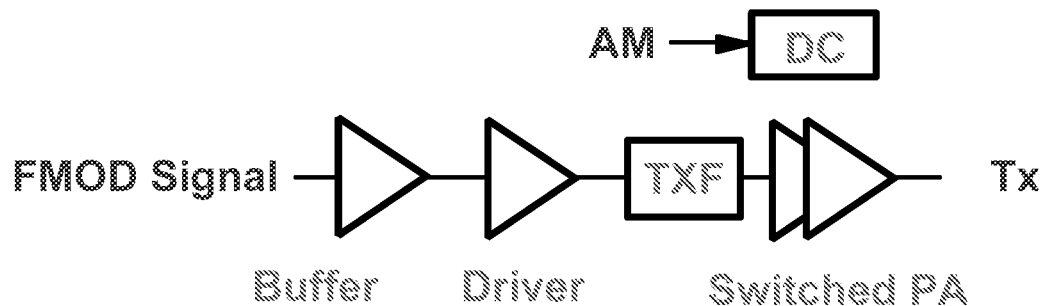
Figure 10:
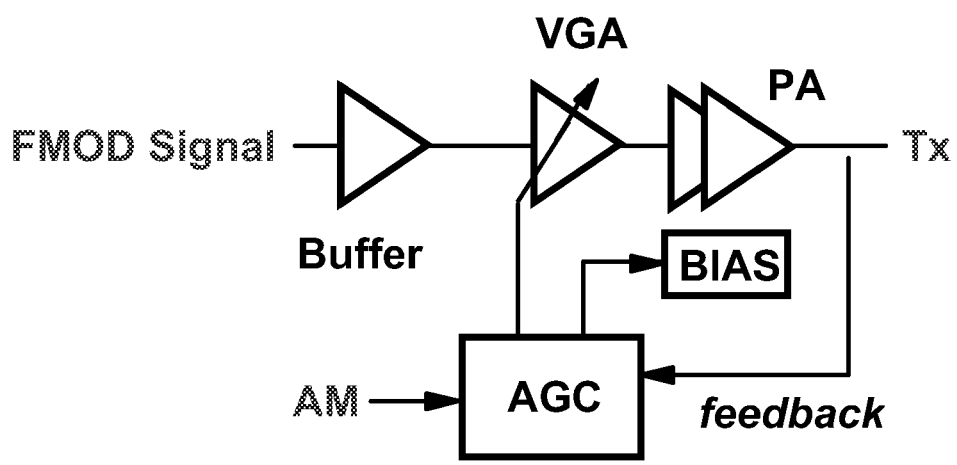

There exist several methods to impress the amplitude modulation onto the VCO output signal. FIG. 10a shows one approach using a simple variable gain amplifier (VGA). It consists of a buffer amplifier, variable gain amplifier, filter, and power amplifier. The buffer isolates the variable gain amplifier from the VCO. This is important because the input impedance of the VGA changes with its gain. Without the isolation, the input impedance changes would pull the VCO's oscillation frequency and create distortion. Ideally, the VGA produces an output described by $$s(t)=A(t)\sin[2\pi(f_c+\text{FM})t]$$

where A(t) is the amplitude modulation and is always positive. This approach—known as small-signal polar modulation or polar lite—eases design but requires a linear power amplifier. It also minimizes the time delay and associated alignment error between the phase/frequency modulator and the amplitude modulator. In most situations, the TXF filter is included to attenuate receive band noise.

FIG. 10b shows a second approach. It includes a buffer, driver amplifier, filter, and switched power amplifier supplied by a dc-dc regulator. In this approach, the amplitude modulation is applied through a dc-dc regulator. The dc-dc regulator produces an output level $V_+$ that tracks the AM signal and consequently restricts the power amplifier's signal swing. It follows that the power amplifier switches between its saturation voltage $V_{sat}$ and $2V_+$ with $$s(t) \approx A(t)\{1+\text{sign}(\sin[2\pi(f_c+\text{FM})t])\}+V_{sat}$$

A driver amplifier boosts the amplitude of the phase/frequency modulated signal to ensure the switched PA fully switches even at high AM and $V_+$ levels. In practice, the switching operation of the PA produces multiple harmonics that must be attenuated by the its output matching network. To minimize noise, the dc-dc regulator typically uses large capacitors which unfortunately slow the response to the amplitude modulation input. The TXF filter is used to attenuate any wideband noise that could fold in band due to the amplifier's switching response.

FIG. 10c shows a third method for amplitude modulation. It consists of a buffer, variable gain amplifier, power amplifier, and feedback network to control the transmitter's output. The feedback network linearizes the response to the amplitude modulation signal A(t). However, as with any feedback network, its behavior—and particularly its delay—depends on the loop parameters which unfortunately vary. This means the required offset to align the amplitude modulation to the phase/frequency modulation also varies.

Figure 11A:
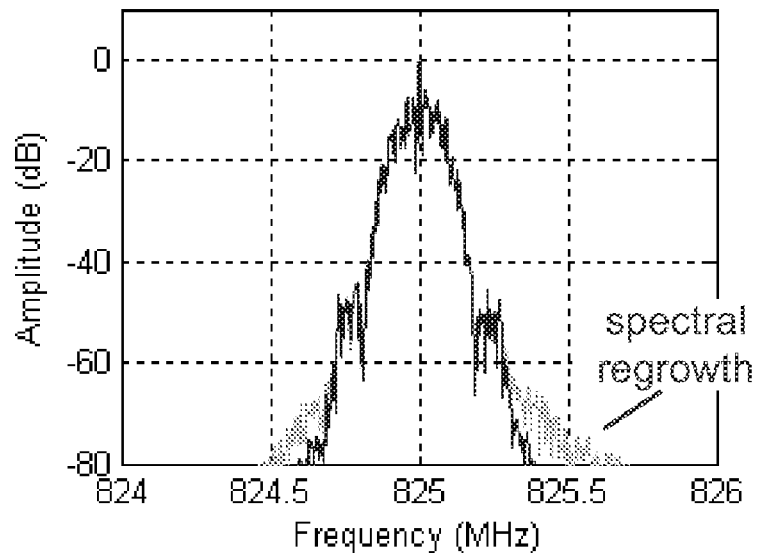
FIG. 11a illustrates the spectral regrowth in an EDGE polar transmitter due to 10 nSec timing error.
Figure 11:
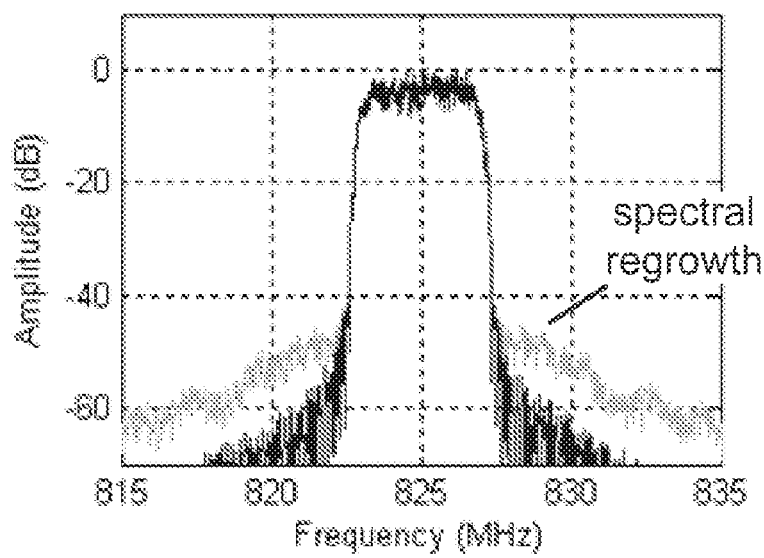
FIG. 11b illustrates the spectral regrowth in an WCDMA polar transmitter due to 2.5 nSec timing error.

Ideally, the amplitude modulation precisely aligns to the phase/frequency modulation, avoiding spectral regrowth and EVM degradation. Even small timing errors affect the frequency spectrum of the complex transmit signal. This is illustrated in FIG. 11a for an EDGE polar system with 10 nSec of timing error. The issue becomes more critical for WCDMA as shown in FIG. 11b. Here, the timing error is only 2 nSec.

Figure 12:
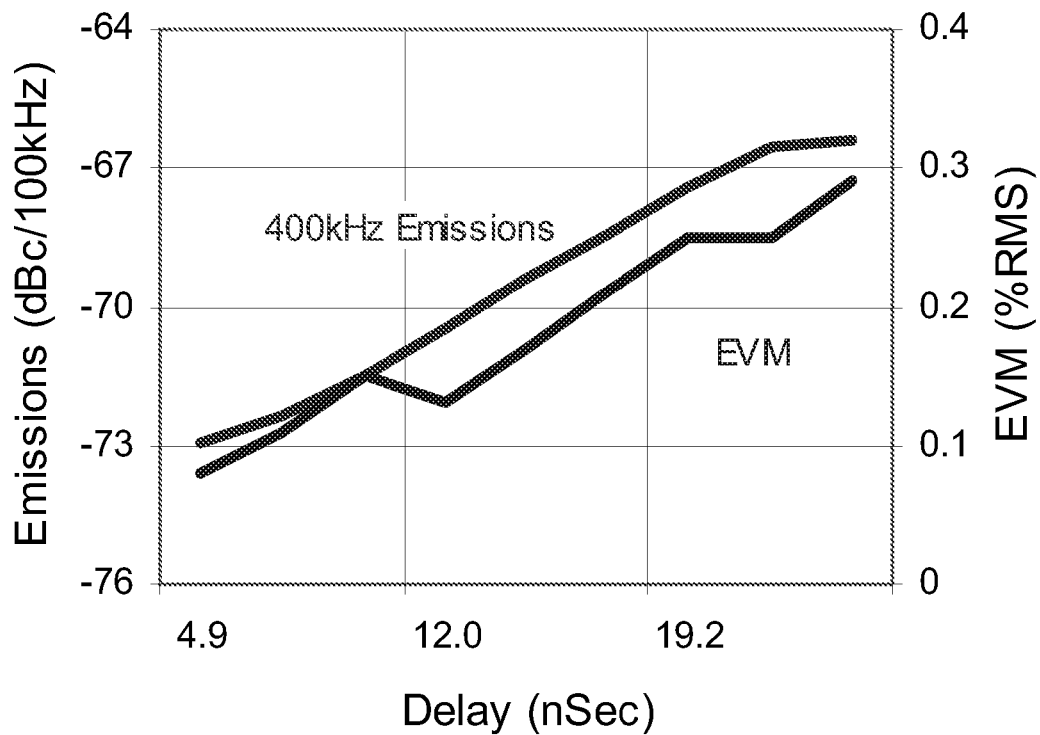
FIG. 12a illustrates the performance sensitivity of the EDGE polar transmitter to timing errors.
FIG. 12b illustrates the performance sensitivity of the WCDMA polar transmitter to timing errors.
Figure 12:
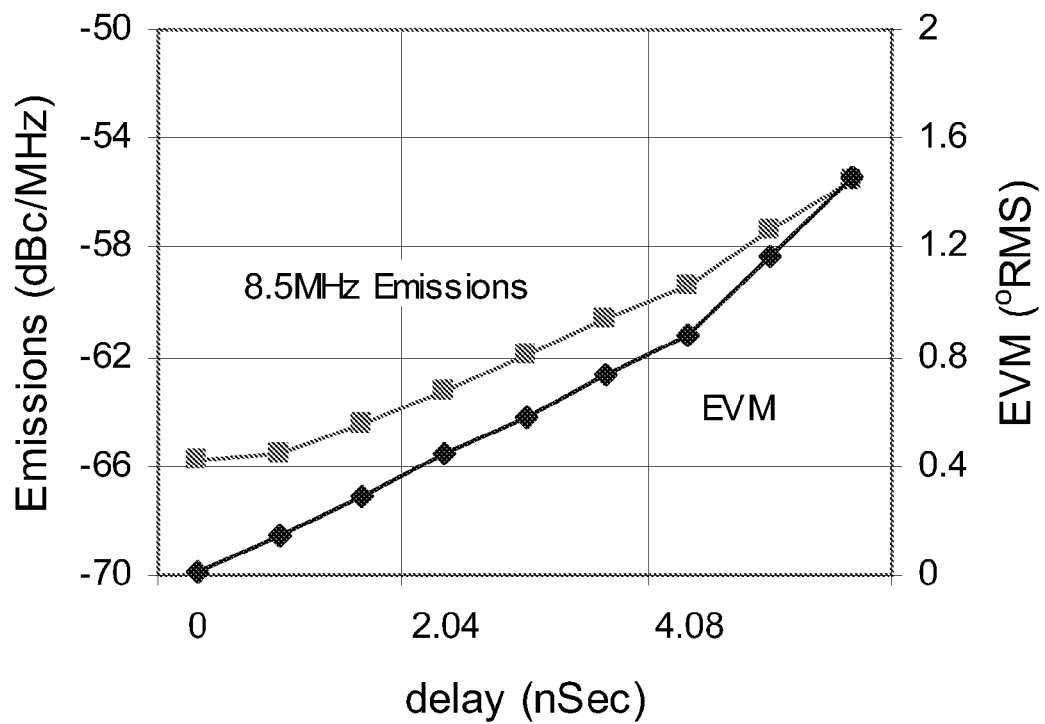

Timing errors also distort the transmitted signal and thereby affect the ability of a receiver to properly detect the message data. This effect is measured by the error vector magnitude (EVM). The sensitivity of the modulation system to timing error varies with the symbol rate—making WCDMA systems (3.84 Mcps) much more sensitive than EDGE systems (270 ksps). FIG. 12a shows the sensitivity of EDGE polar transmitters to timing error. FIG. 12b shows the sensitivity of WCDMA polar transmitters to timing error.

Figure 13:
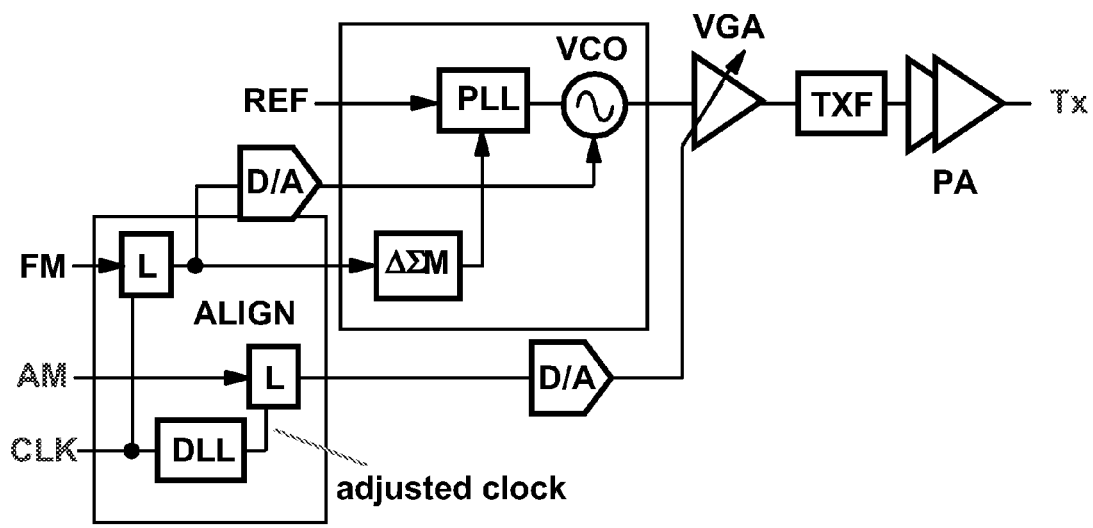
FIG. 13a shows a polar transmitter with timing alignment of the AM and FM signals using a delay-locked loop, in accordance with the present invention.
FIG. 13b shows a polar transmitter with timing alignment of the AM and FM signals using digital delay, in accordance with the present invention.
Figure 13:
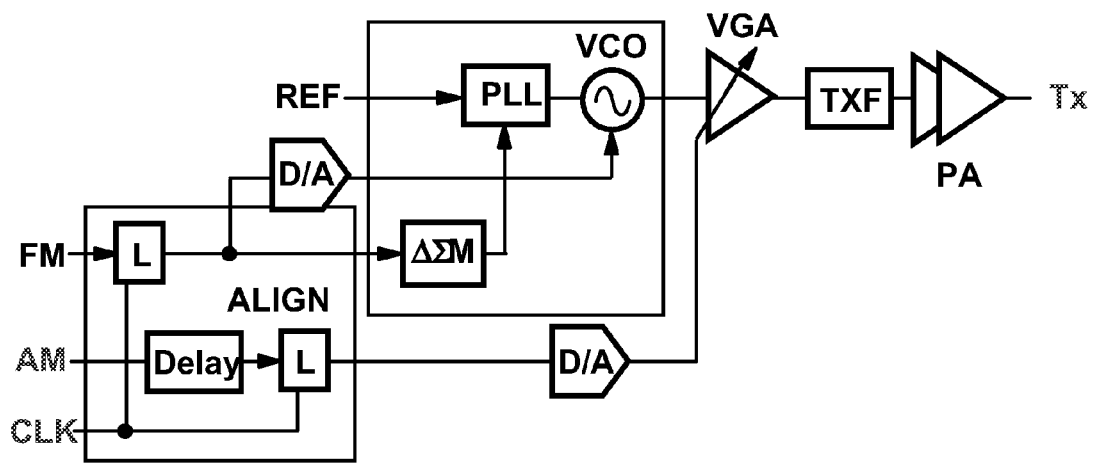

Fortunately, the system shown in FIG. 13a can align the amplitude modulation to the phase/frequency modulation. Although the system of FIG. 13a is shown as receiving input amplitude modulation (AM) and frequency modulation (FM) signals, it may also receive an input phase-modulated signal in lieu of an FM signal. In this case a simple difference circuit (not shown) is used to compute the derivative of the input phase data. As shown, the system of FIG. 13(a) includes a signal alignment module which independently adjusts the timing of the AM and FM input digital data using two latches and a delay locked loop, thereby producing time-aligned AM and FM modulation control data. The delay locked loop generates an output signal with selectable delay.

FIG. 13b shows another method to generate time-aligned AM and FM modulation control data based upon the input AM and FM digital data. In this approach the signal alignment module operates digitally to adjust the delay of the input AM signal through a delay equalizer or programmable filter.

Figure 14A:
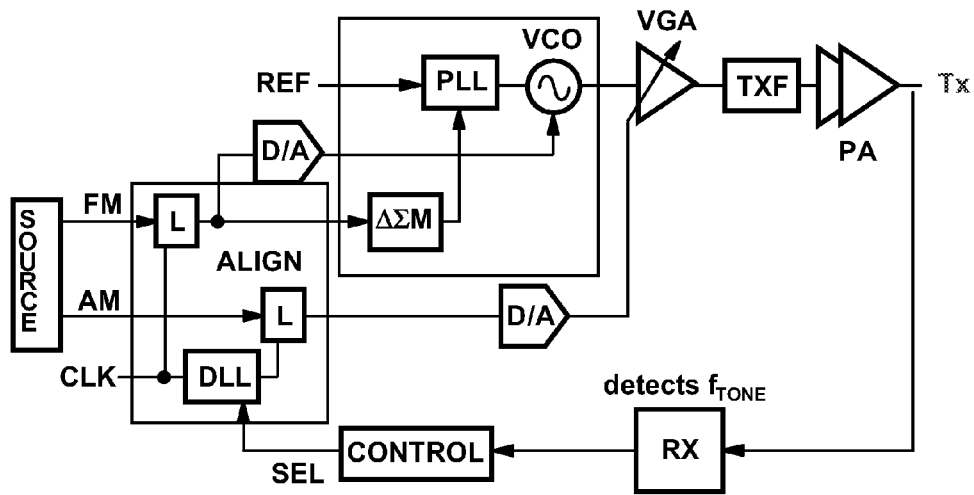
FIG. 14a shows a diagram of a system for adjusting the time alignment of polar transmitters, in accordance with the present invention.

The delay is selected using the time alignment network shown in FIG. 14a. It generates a test signal that reveals polar modulation timing errors using a simple receiver. The receiver monitors the received signal and adjusts the timing alignment until the signal energy is nulled. The result is near perfect alignment. It is noted that in WCDMA-based embodiments, the transmit signal connects directly to the receiver in the time alignment network through a duplex filter (not shown). In GSM/EDGE-based embodiments, the transmit signal is routed to the receiver using either a switch or RF coupler (not shown).

The test signal is applied and the AM/FM timing is aligned when the transmitter is first activated. In practice, this is sufficient since any delay changes should be small. If needed, the calibration can be repeated in any empty transmission slot.

Figure 14B:
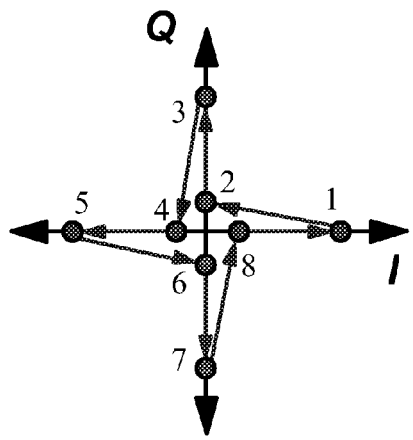
FIG. 14b illustrates the symbol pattern used to enhance timing errors as part of the alignment system of FIG. 14a, in accordance with the present invention.

The alignment network exploits a special class of complex transmit signals that enhance timing errors. This special class of complex transmit signals simply isolates amplitude and phase changes. FIG. 14b shows an example. It's described by the sequences $$I=[r_1,0,0,-r_2,-r_1,0,0,r_2] \text{ and } Q=[0,r_2,r_1,0,0,-r_2,-r_1,0]$$

where $r_1 > r_2$. These sequences generate a signal that changes amplitude moving from odd symbols to even symbols and changes phase moving from even symbols to odd symbols.

Figure 14C:
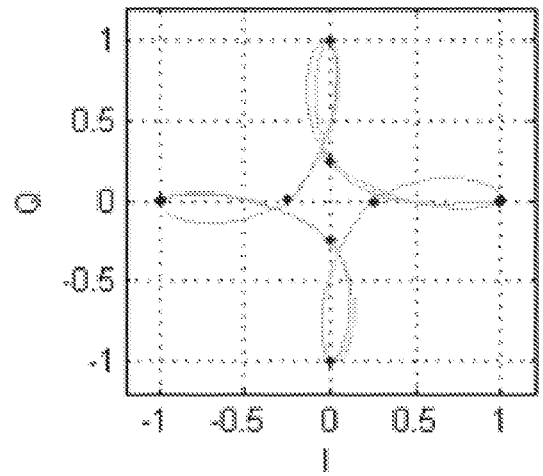
FIG. 14c illustrates the complex signal trajectory associated with the symbol pattern shown in FIG. 14b and part of the alignment system of FIG. 14a, in accordance with the present invention.
Figure 14D:
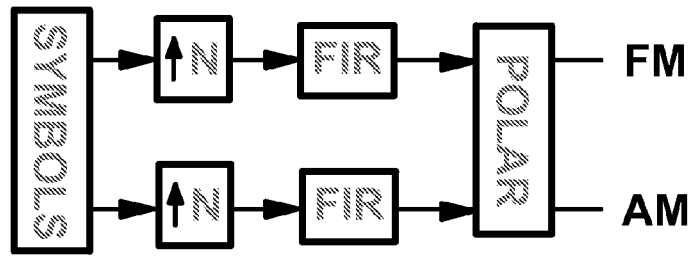
FIG. 14d shows a diagram of the digital signal source that generates the test signal associated with the alignment system of FIG. 14a, in accordance with the present invention.

The digital signal source interpolates the special complex transmit signal to smooth the frequency and amplitude modulation signals. This results in the complex signal trajectory illustrated in FIG. 14c. The interpolation operation is part of the signal source detailed in FIG. 14d. This operation effectively up-samples the I/Q data and then filters these signals to limit their bandwidth. The resulting data streams are then converted to polar format, FM and AM. Ideally, this signal is unaffected by the low pass filters typically included in the polar transmitter to attenuate wideband noise and D/A converter image signals.

Figure 14E:
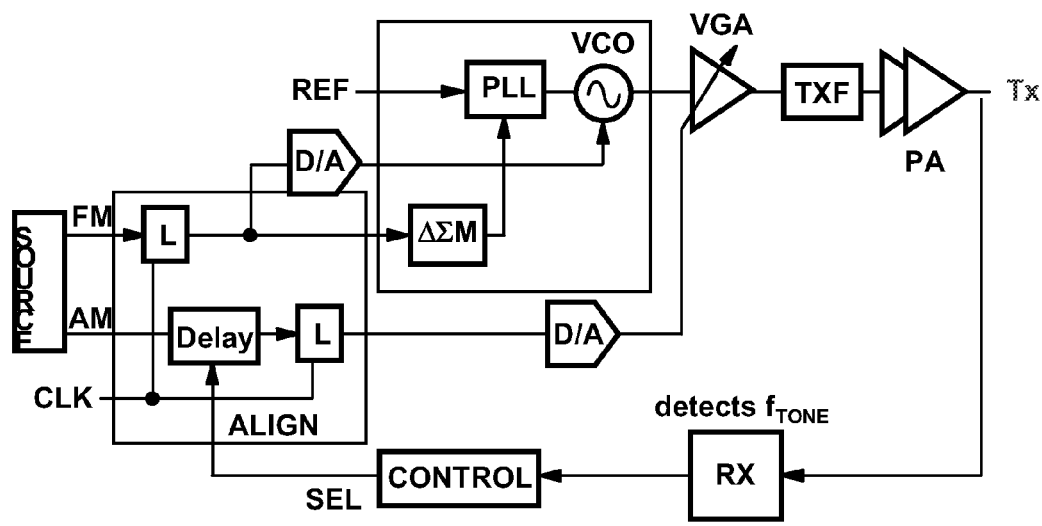
FIG. 14e shows a diagram of an alternate system for adjusting the time alignment of polar transmitters, in accordance with the present invention.

FIG. 14e shows an alternative approach to align the AM and FM signals. It is based on the digital delay concept of FIG. 13b.

Figure 15A:
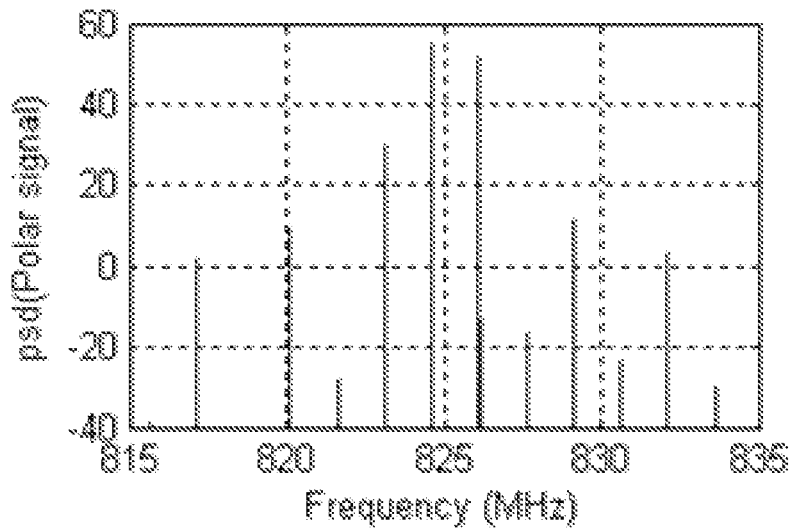
FIG. 15a illustrates the frequency spectrum of a polar transmitter driven by the signal described by FIGS. 14b-c and part of alignment system of FIG. 14a, in accordance with the present invention.
Figure 15B:
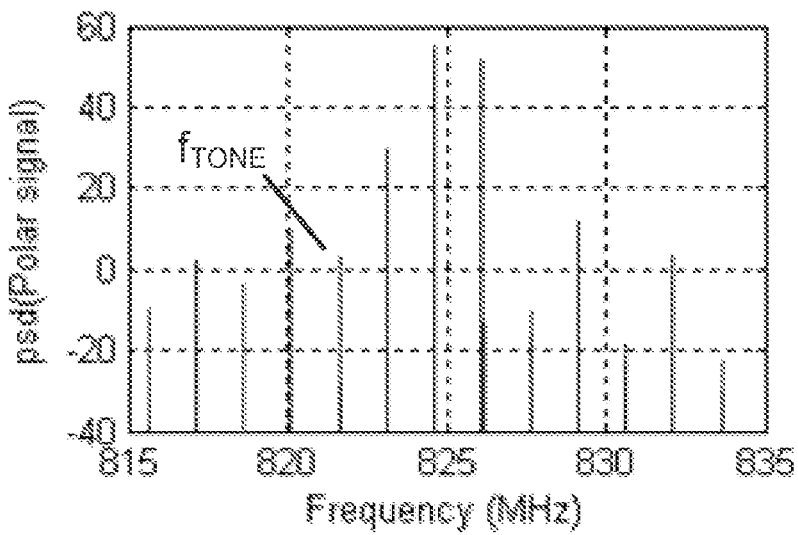
FIG. 15b illustrates the frequency spectrum of a polar transmitter driven by the signal source described by FIGS. 14b-c and part of alignment system of FIG. 14a, with a timing error of 2.5 nSec, in accordance with the present invention.

The frequency spectrum produced by the polar transmitter operating at a carrier frequency of 825 MHz and with the complex pattern of FIG. 14b is shown in FIG. 15a. It generates several frequency tones separated by 1.5 MHz, equal one-half the symbol rate. FIG. 15b shows the same polar transmitter with 2.5 nSec of timing error. The frequency tone at 821.5 MHz grew more than 30 dB. Furthermore, this tone rises as the timing error increases.

Figure 16:
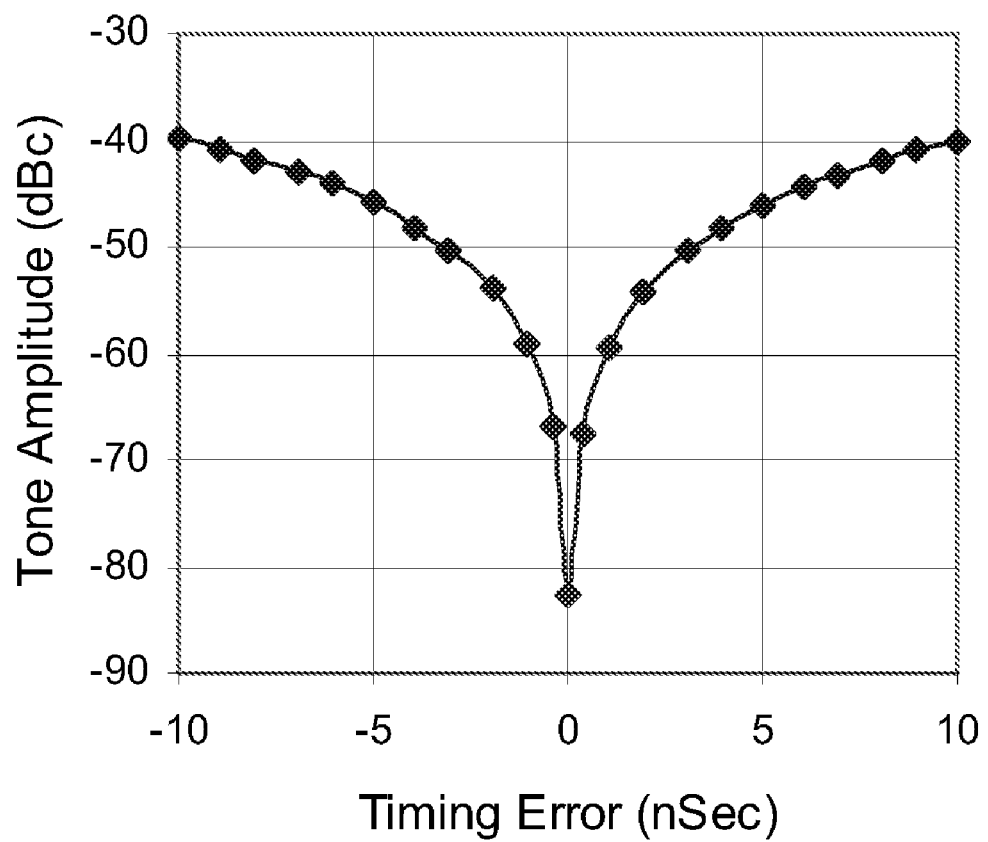
Figure 17A:
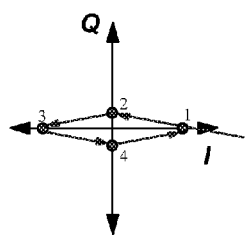
FIG. 17a-d illustrate other examples of symbol patterns, similar to FIG. 14b, that also enhance the timing error as part of the alignment system of FIG. 14a, in accordance with the present invention.
Figure 17B:
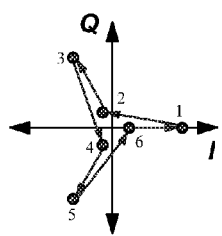
Figure 17C:
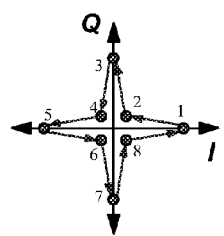
Figure 17:
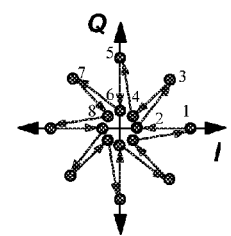

The radio receiver, configured to track the 821.5 MHz tone, easily detects the level. It in turn drives the controller to increase/decrease the offset of the delay from the delay-locked loop by selecting different output signals. The parabolic shape of FIG. 16 guarantees convergence to the optimal timing for the AM and FM signals.

The signal source makes detection of the timing error easy. It relies on a newly-defined class of complex transmit signals that simply isolates amplitude and phase changes. Since this is a class of signals, multiple variations are possible, including, but not limited to, FIGS. 14a and 17a-d.

The alignment network properly adjusts the polar transmitter to minimize spectral regrowth and EVM degradation due to timing errors.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A polar transmitter system, comprising:
   a direct synthesis modulator operative to generate an output signal based upon a reference signal, the direct synthesis modulator being responsive to an amplitude modulation control signal and a frequency modulation control signal; and
   a signal alignment module configured to apply the amplitude modulation control signal and the frequency modulation control signal to the direct synthesis modulator in accordance with a defined timing relationship;
   wherein the amplitude modulation control signal and the frequency modulation control signal are based upon an input amplitude modulation signal and an input phase or frequency modulation signal, respectively; and
   wherein the signal alignment module includes a first latch arrangement which latches the input amplitude modulation signal and a second latch arrangement which latches the input phase or frequency modulation signal.

2. The polar transmitter system of claim 1 wherein the signal alignment module further includes a triggering network configured to establish the defined timing relationship between the amplitude modulation control signal and the frequency modulation control signal.

3. The polar transmitter system of claim 1 wherein the direct synthesis modulator includes a first control port and a second control port, the signal alignment module including a digital to analog converter for providing an analog version of the frequency modulation control signal to the first control port and a digital version of the frequency modulation control signal to the second control port.

4. The polar transmitter system of claim 3 wherein the direct synthesis modulator includes a voltage-controlled oscillator to which is applied the analog version of the frequency modulation control signal and a delta-sigma modulator to which is applied the digital version of the frequency modulation control signal.

5. The polar transmitter system of claim 4 wherein the direct synthesis modulator includes a phase-locked loop operatively connected to the delta-sigma modulator.

6. The polar transmitter system of claim 3 wherein the direct synthesis transmitter further includes an amplifier to which is applied the amplitude modulation control signal.

7. The polar transmitter system of claim 2 wherein the triggering network comprises a delay-locked loop connected between the first latch arrangement and the second latch arrangement.

8. A signal alignment module for use with a polar transmitter, the alignment module comprising:
   a first latch arrangement which latches an input amplitude modulation signal;
   a second latch arrangement which latches an input phase or frequency modulation signal; and
   a triggering network for providing a first timing signal to the first latch arrangement and a second timing signal to the second latch arrangement wherein the triggering network establishes a defined time offset between the first timing signal and the second timing signal.

9. The alignment module of claim 8 wherein the triggering network includes a delay-locked loop.

10. An alignment apparatus for use with a polar transmitter system, the apparatus comprising:
    a signal alignment module configured to apply an amplitude modulation control signal and a frequency modulation control signal to the polar transmitter in accordance with a defined timing relationship; and
    a time alignment network, operatively coupled between an output of the polar transmitter system and the signal alignment module, for setting the defined timing relationship;
    wherein the time alignment network includes:
       a signal source for applying test signals to inputs of the signal alignment module, and
       a control network for determining the defined timing relationship based upon output signals generated by the polar transmitter based upon the test signals.

11. The time alignment apparatus of claim 10 wherein the test signals of an I/Q format including in-phase and quadrature-phase components, the signal source converting the I/Q format of test signals to a polar format.

12. The time alignment apparatus of claim 11 wherein the signal source further includes:
    a first interpolator for interpolating the in-phase components of the test signals;
    a first filter operatively connected to an output of the first interpolator;
    a second interpolator for interpolating the quadrature-phase components of the test signals, and
    a second filter operatively connected to an output of the second interpolator.

13. An apparatus for adjusting signal time alignment within a polar transmitter system, the apparatus comprising:
    a signal alignment module operative to apply control signals to the polar transmitter system; and
    a time alignment network for setting a timing relationship imposed upon the control signals by the signal alignment module, the time alignment network including:
       a signal source unit coupled to the signal alignment module,
       a receiver coupled to an output of the polar transmitter system, and
       a control network coupled between an output of the receiver and the signal alignment module.

14. The apparatus of claim 13 wherein the signal source produces test signals based upon a complex signal characterized by the in-phase (I) and quadrature-phase (Q) sequences:

$$I=[r_1,0,0,-r_2,-r_1,0,0,r_2] \text{ and } Q=[0,r_2,r_1,0,0,-r_2,-r_1,0]$$

where $r_1 > r_2$.

15. The apparatus of claim 13 wherein the signal source produces test signals based upon a complex signal characterized by the in-phase (I) and quadrature-phase (Q) sequences:

$$I=[r_1,0,-r_1,0] \text{ and } Q=[0,r_2,0,-r_2]$$

where $r_1 > r_2$.

16. The apparatus of claim 13 wherein the signal source produces test signals based upon a complex signal characterized by the in-phase (I) and quadrature-phase (Q) sequences:

$$I=[r_1,-r_3,-r_2,-r_3,-r_2,r_3] \text{ and } Q=[0,r_5,r_4,-r_5,-r_4,0]$$

where $r_1 > r_2$ and $r_4 > r_5$.

17. The apparatus of claim 13 wherein the signal source produces test signals based upon a complex signal characterized by the in-phase (I) and quadrature-phase (Q) sequences:

$$I=[r_1,r_2,0,-r_2,-r_1,-r_2,0,r_2] \text{ and } Q=[0,r_2,r_1,r_2,0,-r_2,-r_1,-r_2,]$$

where $r_1 > r_2$.

18. The apparatus of claim 13 wherein the signal source produces test signals based upon a complex signal characterized by the in-phase (I) and quadrature-phase (Q) sequences:

$$I=[r_1,r_3,r_2,r_4,0,-r_4,-r_2,-r_3,-r_1,-r_3,-r_2,-r_4,0,r_4,r_2,r_3]$$
$$\text{and } Q=[0,r_4,r_2,r_3,r_1,r_3,r_2,r_4,0,-r_4,-r_2,-r_3,-r_1,-r_3,-r_2,-r_4]$$

where $r_1>r_2>r_3>r_4$.

19. The apparatus of claim 13 wherein the signal source produces test signals based upon a complex signal that changes amplitude moving from odd symbols to even symbols and changes phase moving from even symbols to odd symbols.

20. The apparatus of claim 13 wherein the signal source produces test signals based upon a complex signal that includes a plurality of symbols, the complex signal changing in amplitude beginning with a first of the plurality of symbols and changing in phase every other symbol beginning with a second of the plurality of symbols different from the first of the plurality of symbols.

21. The apparatus of claim 13 wherein the receiver is disposed to detect a level of a predefined frequency component or tone.

22. The apparatus of claim 21 wherein the control network determines the timing relationship based on the detected level.

* * * * *